United States Patent Office 3,737,387
Patented June 5, 1973

3,737,387
DETERGENT COMPOSITION
Walter L. Marple, St. Joseph, Mich., assignor to
Whirlpool Corporation
No Drawing. Filed June 15, 1970, Ser. No. 46,278
Int. Cl. C09d 9/04; C11d 7/52; C23g 5/02
U.S. Cl. 252—170
15 Claims

ABSTRACT OF THE DISCLOSURE

A detergent composition that may be in the form of either a liquid, a powder or a semi-solid and which when added to water forms a washing solution that can be used in removing efficiently complex fats from fabrics made of either natural or synthetic fibers, the detergent composition consisting essentially of an emulsifier that is neither a polyoxyethylene alkylphenol, a polyoxyethylene alkyl alcohol, a polyoxyethylene ester of fatty acid or a polyalkylene oxide block copolymer containing both ethylene oxide and propylene oxide chains, and an organic solvent for the complex fats. The resulting washing solution made by adding the detergent composition to water is a three phase system having an aqueous phase, a dissolved emulsifier phase and a dispersed non-aqueous solvent phase.

SUMMARY OF THE INVENTION

One of the features of this invention is to provide an improved detergent composition which when added to water produces a washing solution that efficiently removes soils containing complex fats from natural or synthetic fiber fabrics.

Another feature of the invention is to provide an improved washing solution consisting essentially of a combined solution and dispersion in water of the above detergent composition.

A further feature of the invention is an improved method of removing soil containing complex fats from fabrics consisting essentially of washing the fabrics at a temperature of about 80–140° F. until this soil is substantially removed with the washing being conducted in this aqueous solution.

DESCRIPTION OF THE PREFERRED EMBODIMENTS

The detergent composition of this invention consists essentially of about 20–80% by volume of a water soluble emulsifier of the class consisting of polyoxyethylene alkylphenols each containing about 8–21 ethylene oxide groups in the polyethylene oxide chain and about 6 to 9 carbon atoms in the alkyl group, polyoxyethylene alkyl alcohols each containing about 8–21 ethylene oxide groups in the polyethylene oxide chain and about 10 to 18 carbon atoms in the alcohol group, polyoxyethylene esters of fatty acids each containing about 8–21 ethylene oxide groups in the polyethylene chain and about 10 to 18 carbon atoms in each alkyl group of the fatty acid, and polyalkylene oxide block copolymers each containing ethylene oxide chains of from about 8 to 30 ethylene oxide groups and propylene oxide chains of from about 15 to 40 propylene oxide groups, and about 80–20% by volume of an organic solvent of the class consisting of chlorinated hydrocarbons containing about 1 to 4 chlorine groups in the molecule and about 1 to 3 carbon atoms in the hydrocarbon group, mineral spirits within the boiling point range of about 335–410° F., a mixture of Stoddard solvent and 140° F. solvent, ethylene carbonate and propylene carbonate. Stoddard solvent is a petroleum distillate with a boiling range of about 305–375° F. and 140F solvent is a petroleum distillate with a boiling range of about 368–406° F.

In a preferred composition the emulsifier is present in an amount of about 40–80% and the solvent in an amount of about 60–20%, both by volume. Also in this especially preferred composition the polyethylene oxide chain in the alcohols and esters each contain from about 8–12 ethylene oxide groups.

A specific example of a polyoxyethylene alkylphenol is nonylphenol with an average of about 9.5 ethylene oxide groups in each polyethylene oxide chain, a polyoxyethylene alkyl alcohol is tridecyl alcohol with an average of about 9 ethylene oxide groups in each polyethylene oxide chain, a specific example of the ester is polyoxyethylene monolaurate having about 8–12 ethylene oxide groups, and a specific example of the block copolymer is about 60% by weight of polyoxypropylene and about 40% by weight of polyoxyethylene.

In making the washing solution the detergent composition of this invention is added to water in an amount of about 0.05–0.25% by weight of the resulting solution. This produces a three phase system of the water as a continuous phase, the emulsifier dissolved therein and the non-aqueous organic solvent dispersed in the water. When used in washing fabrics, the emulsified solvent dissolves and removes the complex fat stains as well as other fats that may be present, the emulsifier both disperses the solvent in the water so that it is available for dissolving the fat stains and also removes simple fat stains by an emulsification process. In addition, the water present not only serves as a carrier for the solvent and emulsifier but also removes water soluble stains from the fabrics. The result is that the three ingredients very efficiently clean the fabrics in a single operation.

The washing solution is preferably used at a temperature of about 80–140° F. and is efficient on both natural and synthetic fabrics such as cotton, polyesters and blends thereof such as the well known 65/35 polyester cotton blend.

The detergent composition of this invention may be packaged and distributed in the form of a liquid, powder, pellets, flakes and the like. It is extremely effective in removing complex fats which are those containing polytriglycerides as contrasted to the monotriglycerides of simple fats. Examples of complex fats are lard, butter and animal fats.

A very important advantage of the detergent compositions of this invention is that in a concentration in water of 0.1% or more they exhibit strong bacteriostatic characteristics.

EXAMPLE 1

In one example of practicing the invention the detergent formulation according to the invention consisted of a mixture of 40 volume percent of a polyethylene oxide derivative of nonylphenol containing an average of 9.5 ethylene oxide groups in the molecule and 60 volume percent of trichloroethylene. In a washing test to remove a deposit (containing 0.02 gram of soil on a 4 square inch piece of fabric) of soil consisting of complex fats in the form of a deposit of lard, the fabric was washed in a home laundry washer for 5 minutes with a solution of an ordinary home laundry detergent and then for 5 minutes with a solution containing 99.8% by weight of water and 0.2% of the aforesaid formulation of this invention. The fabric was 65/35 Dacron/cotton. At the end of this time most of the soil had been removed from the fabric. Thus with a 5 minute ordinary washing with a solution containing 0.2% of a customary home laundry detergent followed by the above 5 minutes with the composition of this invention 77.3% of the lard was removed. When the cycle was increased to 10 minutes with the detergent of this invention 87.3% of the lard was removed.

For comparison, using as a control a 10 minute ordinary washing with a solution containing 0.2% of a conventional home laundry detergent, only 42.0% of the lard was removed.

Additional examples of emulsifier-solvent formulations of this invention are as follows:

| Example | | Percent by volume |
| --- | --- | --- |
| 2 | Tridecyl alcohol—9 moles ethylene oxide | 50.0 |
| | Tetrachloroethylene | 50.0 |
| 3 | Block copolymer composed of 26 moles ethylene oxide and 30 moles propylene oxide. [HO(C$_2$H$_4$O)$_{13}$(C$_3$H$_6$O)$_{30}$(C$_2$H$_4$O)$_{13}$H] | 50.0 |
| | Stoddard solvent | 50.0 |
| 4 | Polyoxyethylene mololaurate—8 moles ethylene oxide. | 50.0 |
| | Tetrachloroethylene | 50.0 |
| 5 | Iso-octylphenol—7 moles ethylene oxide | 33.0 |
| | 1,1,1-trichloroethane | 67.0 |
| 6 | Nonylphenol—9.5 moles ethylene oxide | 50.0 |
| | Propylene carbonate | 50.0 |
| 7 | Tridecyl alcohol—9 moles ethylene oxide | 50.0 |
| | 140F solvent | 50.0 |

Each of the compositions of Examples 2, 3, 5, 6 and 7 were used in a concentration of 0.2% by weight in water as in Example 1 to remove complex fats in the form of pure triolein rather than lard from 65/35 Dacron/cotton fabric in a 10 minute wash cycle, the water operating at 68 r.p.m. and with water at 122° F.

| Example | Percent triolein removal |
| --- | --- |
| 2 | 63.9 |
| 3 | 50.0 |
| 5 | 71.3 |
| 6 | 53.6 |
| 7 | 40.7 |

Having described my invention as related to the embodiments set out herein, it is my intention that the invention be not limited by any of the details of description, unless otherwise specified, but rather be construed broadly within its spirit and scope as set out in the appended claims.

I claim:

1. A detergent composition for adding to water to produce a washing solution that efficiently removes soils containing complex fats from fabrics, consisting essentially of:
   about 20–80% by volume of a water soluble emulsifier of the class consisting of
   (a) polyoxyethylene alkylphenols each containing about 8–21 ethylene oxide groups in the polyethylene oxide chain and about 6 to 9 carbon atoms in the alkyl group,
   (b) polyoxyethylene alkyl alcohols each containing about 8–21 ethylene oxide groups in the polyethylene oxide chain and about 10 to 18 carbon atoms in the alcohol group,
   (c) polyoxyethylene esters of fatty acids each containing about 8–21 ethylene oxide groups in the polyethylene chain and about 10 to 18 carbon atoms in each alkyl group of the fatty acid, and
   (d) polyalkylene oxide block copolymers each containing ethylene oxide chains of from about 8 to 30 ethylene oxide groups and propylene oxide chains of from about 15 to 40 propylene oxide groups; and
   about 80–20% by volume of an organic solvent of the class consisting of chlorinated hydrocarbons containing about 1 to 4 chlorine groups in the molecule and about 1 to 3 carbon atoms in the hydrocarbon group, mineral spirits within the boiling point range of about 335–410° F., a mixture of a petroleum distillate with a boiling range of about 305–375° F. and a petroleum distillate with a boiling range of about 368–406° F., ethylene carbonate and propylene carbonate.

2. The composition of claim 1 wherein said emulsifier is present in about 40–80% by volume and said solvent in about 60–20% by volume.

3. The composition of claim 1 wherein said alcohol and esters each contain 8–12 ethylene oxide groups in each polyethylene oxide chain.

4. The composition of claim 1 wherein (a) consists essentially of nonylphenol with an average of about 9.5 ethylene oxide groups in each polyethylene oxide chain.

5. The composition of claim 1 wherein (b) consists essentially of tridecyl alcohol with an average of about 9 ethylene oxide groups in each polyethylene oxide chain.

6. The composition of claim 1 wherein (c) consists essentially of polyoxyethylene monolaurate having about 8–12 ethylene oxide groups.

7. The composition of claim 1 wherein (d) consists essentially of about 60% by weight of polyoxypropylene and about 40% by weight of a polypropylene.

8. A washing solution for efficiently removing soils containing complex fats from fabrics, said solution consisting essentially of water and about 0.05–0.25% by weight of the solution of a detergent composition consisting essentially of:
   about 20–80% by volume of a water soluble emulsifier of the class consisting of
   (a) polyoxyethylene alkylphenols each containing about 8–21 ethylene oxide groups in the polyethylene oxide chain and about 6 to 9 carbon atoms in the alkyl group,
   (b) polyoxyethylene alkyl alcohols each containing about 8–21 ethylene oxide groups in the polyethylene oxide chain and about 10 to 18 carbon atoms in the alcohol group,
   (c) polyoxyethylene esters of fatty acids each containing about 8–21 ethylene oxide groups in the polyethylene chain and about 10 to 18 carbon atoms in each alkyl group of the fatty acid, and
   (d) polyalkylene oxide block copolymers each containing ethylene oxide chains of from about 8 to 30 ethylene oxide groups and propylene oxide chains of from about 15 to 40 propylene oxide groups; and
   about 80–20% by volume of an organic solvent of the class consisting of chlorinated hydrocarbons containing about 1 to 4 chlorine groups in the molecule and about 1 to 3 carbon atoms in the hydrocarbon group, mineral spirits within the boiling point range of about 335–410° F., a mixture of a petroleum distillate with a boiling range of about 305–375° F. and a petroleum distillate with a boiling range of about 368–406° F., ethylene carbonate and propylene carbonate.

9. The solution of claim 8 wherein said emulsifier is present in about 40–80% by volume and said solvent in about 60–20% by volume in said detergent composition.

10. The composition of claim 8 wherein said alcohols and esters each contain about 8–12 ethylene oxide groups in each polyethylene oxide chain.

11. The composition of claim 8 wherein (a) consists essentially of nonylphenol with an average of about 9.5 ethylene oxide groups in each polyethylene oxide chain, (b) consists essentially of tridecyl alcohol with an average of about 9 ethylene oxide groups in each polyethylene oxide chain, (c) consists essentially of polyoxyethylene monolaurate having about 8–12 ethylene oxide groups, and (d) consists essentially of about 60% by weight of polyoxypropylene and about 40% by weight of polyoxyethylene.

12. The method of removing soil containing complex fats from fabrics consisting essentially of washing said fabrics at a temperature of about 80–140° F. until said soil is substantially removed in an aqueous solution containing about 0.05–0.25% by weight of the solution of a detergent composition consisting essentially of
  about 20–80% by volume of a water soluble emulsifier of the class consisting of
   (a) polyoxyethylene alkylphenols each containing about 8–21 ethylene oxide groups in the polyethylene oxide chain and about 6 to 9 carbon atoms in the alkyl group,
   (b) polyoxyethylene alkyl alcohols each containing about 8–21 ethylene oxide groups in the polyethylene oxide chain and about 10 to 18 carbon atoms in the alcohol group,
   (c) polyoxyethylene esters of fatty acids each containing about 8–21 ethylene oxide groups in the polyethylene chain and about 10 to 18 carbon atoms in each alkyl group of the fatty acid, and
   (d) polyalkylene oxide block copolymers each containing ethylene oxide chains of from about 8 to 30 ethylene oxide groups and propylene oxide chains of from about 15 to 40 propylene oxide groups; and
  about 80–20% by volume of an organic solvent of the class consisting of chlorinated hydrocarbons containing about 1 to 4 chlorine groups in the molecule and about 1 to 3 carbon atoms in the hydrocarbon group, mineral spirits within the boiling point range of about 335–410° F., a mixture of a petroleum distillate with a boiling range of about 305–375° F., and a petroleum distillate with a boiling range of about 368–406° F., ethylene carbonate and propylene carbonate.

13. The method of claim 12 wherein said emulsifier is present in about 40–80% by volume and said solvent in about 60–20% by volume in said detergent composition.

14. The method of claim 12 wherein said alcohols and esters each contain about 8–12 ethylene oxide groups in each polyethylene oxide chain.

15. The method of claim 12 wherein (a) consists essentially of nonylphenol with an average of about 9.5 ethylene oxide groups in each polyethylene oxide chain, (b) consists essentially of tridecyl alcohol with an average of about 9 ethylene oxide groups in each polyethylene oxide chain, (c) consists essentially of polyoxyethylene monolaurate having about 8–12 ethylene oxide groups, and (d) consists essentially of about 60% by weight of polyoxypropylene and about 40% by weight of polyoxyethylene.

References Cited
UNITED STATES PATENTS

| | | | |
|---|---|---|---|
| 1,970,578 | 8/1934 | Schoeller et al. | 252—89 |
| 3,167,514 | 1/1965 | Baker | 252—170 |
| 3,499,841 | 3/1970 | Jakobi et al. | 252—170 |
| 3,501,373 | 3/1970 | Illingworth | 252—170 |

OTHER REFERENCES

Rose, The Cond-Chem. Dict. Reinhold Pub. Co., 7th ed. (1966), pp. 390, 391, 791.

WILLIAM E. SCHULZ, Primary Examiner

U.S. Cl. X.R.

252—89, DIG. 1